(12) United States Patent
Yuan et al.

(10) Patent No.: US 8,826,404 B2
(45) Date of Patent: Sep. 2, 2014

(54) METHOD AND COMMUNICATION DEVICE FOR ACCESSING TO DEVICES IN SECURITY

(75) Inventors: Lelin Yuan, Shenzhen (CN); Shuai Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 86 days.

(21) Appl. No.: 13/598,236

(22) Filed: Aug. 29, 2012

(65) Prior Publication Data

US 2012/0331538 A1 Dec. 27, 2012

Related U.S. Application Data

(63) Continuation of application No. PCT/CN2011/071223, filed on Feb. 24, 2011.

(30) Foreign Application Priority Data

Mar. 2, 2010 (CN) .......................... 2010 1 0117583

(51) Int. Cl.
*H04L 29/06* (2006.01)
*H04L 9/32* (2006.01)

(52) U.S. Cl.
CPC ............... *H04L 63/08* (2013.01); *H04L 63/18* (2013.01); *H04L 9/3215* (2013.01)
USPC .................................................. 726/7; 726/5

(58) Field of Classification Search
CPC ........ H04L 63/08; H04L 63/18; H04L 9/3215
USPC ............................................................ 726/7
See application file for complete search history.

(56) References Cited

U.S. PATENT DOCUMENTS 7,310,744 B2 12/2007 Maity et al.
7,430,670 B1 9/2008 Horning et al.
(Continued)

FOREIGN PATENT DOCUMENTS

CN 1929371 A 3/2007
CN 101167305 A 4/2008
(Continued)

OTHER PUBLICATIONS

Kui Ren et al. "A Novel Privacy Preserving Authentication and Access Control Scheme for Pervasive Computing Environments." IEEE Transactions on Vehicular Technology, vol. 55, No. 4, Jul. 2006.*

(Continued)

*Primary Examiner* — Thanhnga B Truong
*Assistant Examiner* — Narciso Victoria
(74) *Attorney, Agent, or Firm* — Brinks Gilson & Lione (57) ABSTRACT

A method for a communication device for securely accessing a device includes obtaining accessing authentication information via an out-band channel, the accessing authentication information being used for accessing authentication between a service request device and a service providing device, the service request device and the service providing device sharing the same management device, and forming the out-band channel with the management device respectively (11); and authenticating the accessing authentication information, and providing, by the service providing device, when an authentication result indicates that the authentication of the accessing authentication information is passed, service for the service request device via an in-band data channel, the service providing device and the service request device forming the in-band data channel via a service network (12).

12 Claims, 4 Drawing Sheets

---

Obtaining accessing authentication information via an out-band channel, the accessing authentication information being used for accessing authentication between a service request device and a service providing device, the service request device and the service providing device sharing the same management device, and forming the out-band channel with the management device respectively — 11

↓

Authenticating the accessing authentication information, and providing, by the service providing device, when an authentication result indicates that the authentication of the accessing authentication information is passed, service for the service request device via an in-band data channel, the service providing device and the service request device forming the in-band data channel via a service network. — 12

(56) References Cited

U.S. PATENT DOCUMENTS

| | | | |
|---|---|---|---|
| 7,436,965 B2 * | 10/2008 | Sherman | 380/278 |
| 7,606,938 B2 | 10/2009 | Roese et al. | |
| 8,146,142 B2 * | 3/2012 | Lortz et al. | 726/6 |
| 8,532,304 B2 * | 9/2013 | Asokan et al. | 380/284 |
| 2008/0232563 A1 | 9/2008 | Chen et al. | |
| 2009/0259838 A1 | 10/2009 | Lin | |
| 2010/0107223 A1 | 4/2010 | Zheng | |

FOREIGN PATENT DOCUMENTS

| | | |
|---|---|---|
| CN | 101340287 A | 1/2009 |
| CN | 101599896 A | 12/2009 |
| EP | 1840814 A1 | 10/2007 |
| EP | 1 933 498 A1 | 6/2008 |
| GB | 2424151 A | 9/2006 |

OTHER PUBLICATIONS

Office Action issued in corresponding Chinese Patent Application No. 201010117583.8, mailed May 6, 2013, 10 pages.

Extended European Search Report issued in corresponding European Patent Application No. 11750166.8, mailed Mar. 26, 2013.

Written Opinion of the International Searching Authority issued in corresponding PCT Patent Application No. PCT/CN2011/071223, mailed Jun. 2, 2011.

International Search Report issued in corresponding PCT Application No. PCT/CN2011/071223; Jun. 2, 2011.

* cited by examiner

METHOD AND COMMUNICATION DEVICE FOR ACCESSING TO DEVICES IN SECURITY

CROSS-REFERENCE TO RELATED APPLICATIONS

The present application is a continuation of International Application No. PCT/CN2011/071223, filed on Feb. 24, 2011, which claims priority to Chinese Patent Application No. 201010117583.8, entitled "Method and Communication Device for Accessing to Devices in Security", and filed before the Chinese Patent Office on Mar. 2, 2010, both of which are hereby incorporated by reference in their entireties.

FIELD OF THE APPLICATION

The present application relates to the field of communications technology, and particularly to a method and a communication device for accessing to devices in security.

BACKGROUND OF THE APPLICATION

In a distributed system, a service scheme is segmented into relatively independent service nodes according to service functions to be deployed on different physical nodes of the same network, the nodes interacting with each other to complete the processing of service streams. The distributed system is widely applied in solutions of the field based on blade servers, for instance, distributed systems are present in great numbers in telecommunication products based on the Advanced Telecom Computing Architecture (ATCA). Accessing authentication among nodes, namely among hosts, in the distributed system presents a safety problem that should not be neglected.

Control of accessing authentication among hosts in the distributed system generally adopts the password authentication mechanism. A source host initiates an accessing request with the information of account number and password to a target host via a service network. The target host receives the accessing request, matches the accessing account number and password with valid account numbers and passwords locally stored in the target host, provides service to the source host if the matching is successful, and otherwise denies the accessing request.

As the inventors found during the process of implementing embodiments, the prior-art mechanism for accessing to hosts transmits accessing requests that include essential information, such as passwords, over the service network, but the service network is an open network, so that the essential information, such as passwords, is easily detected and deciphered by sniffing tools, thus lowering the reliability of the essential information, such as passwords, whereby security of accessing among hosts is lowered.

SUMMARY OF THE APPLICATION

Embodiments provide a method and a communication device for accessing to devices in security, so as to enhance security of accessing to devices in a distributed system which is tree connection.

Embodiments provide a method for accessing to devices in security, which comprises obtaining accessing authentication information via an out-band channel, the accessing authentication information being used for accessing authentication between a service request device and a service providing device, the service request device and the service providing device sharing the same management device, and forming the out-band channel with the management device respectively; and authenticating the accessing authentication information, and providing, by the service providing device, when an authentication result indicates that the authentication of the accessing authentication information is passed, service for the service request device via an in-band data channel, the service providing device and the service request device forming the in-band data channel via a service network.

Embodiments further provide a communication device, which comprises an obtaining module configured to obtain accessing authentication information via an out-band channel, the accessing authentication information being used for accessing authentication between a service request device and a service providing device, the service request device and the service providing device sharing the same management device, and forming the out-band channel with the management device respectively; and an authenticating module configured to authenticate the accessing authentication information, and provide, by the service providing device, when an authentication result indicates that the authentication of the accessing authentication information is passed, service for the service request device via an in-band data channel, the service providing device and the service request device forming the in-band data channel via a service network.

In the embodiments, communications channels for service exchange and for accessing authentication are separated from each other, service data is transmitted using the in-band data channel, and accessing authentication information needed for accessing authentication is transmitted using the out-band channel. Since it is not necessary for the accessing authentication information needed for accessing authentication to pass through the external service network, the probability for the accessing authentication information being intercepted or tampered with during the process of transmission is reduced, and reliability for transmission of the accessing authentication information is enhanced, thereby improving the security for accessing to devices in a distributed system which is tree connection.

BRIEF DESCRIPTION OF THE DRAWINGS

To make clearer the explanation of technical solutions of the embodiments or of the prior art, accompanying drawings needed in the description of the embodiments or the prior art are briefly illustrated below. Apparently, the accompanying drawings illustrated below are directed to some embodiments, and it is possible for persons ordinarily skilled in the art to deduce other drawings from these drawings without creative effort.

DETAILED DESCRIPTION OF THE EMBODIMENTS

The technical solutions according to the embodiments are clearly and completely described below with reference to the accompanying drawings. Apparently, the embodiments as described below are merely partial, rather than entire, embodiments. On the basis of the embodiments, all other embodiments obtainable by persons ordinarily skilled in the art without creative effort shall all fall within the protection scope of the claims.

Figure 1:
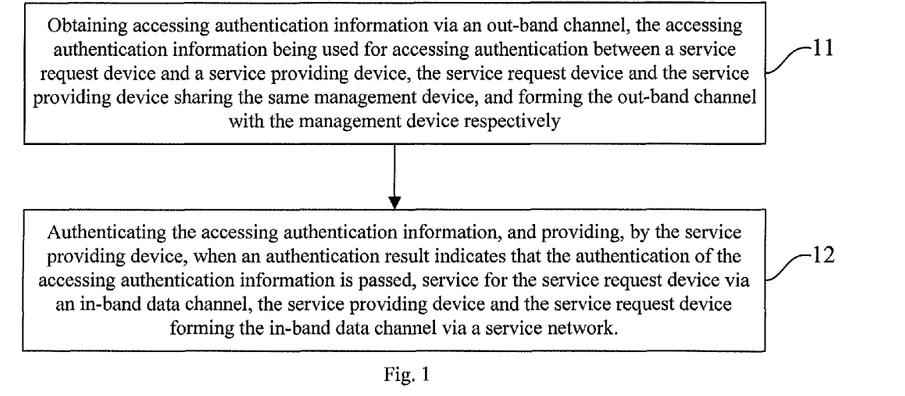
FIG. 1 is a flowchart illustrating the method for accessing to devices in security according to Embodiment 1.

FIG. 1 is a flowchart illustrating the method for accessing to devices in security according to Embodiment 1. As shown in FIG. 1, the method for accessing to devices in security according to this embodiment comprises:

Step 11: obtaining accessing authentication information via an out-band channel, the accessing authentication information being used for accessing authentication between a service request device and a service providing device, the service request device and the service providing device sharing the same management device, and forming the out-band channel with the management device respectively.

The service request device and the service providing device are connected to the same management device and uniformly managed by the management device, thus the service request device, the service providing device and the management device form a distributed system which is tree connection, where the management device serves as the root node, and the service request device and the service providing device respectively serve as child nodes.

According to difference in networking modes, the networking modes can be classified as out-band networking and in-band networking. Out-band networking makes use of a communication channel provided by another device, rather than a communication channel provided by the managed device itself, to transmit network management information, and perform network device management. In-band networking makes use of a service channel provided by the managed device to perform network device management; under the in-band networking mode, the network management information is transmitted over the service channel of the device. In comparison with in-band networking, out-band networking is capable of providing a more reliable device management channel, if the managed device fails, it is still capable of positioning and monitoring the network device in real time. The channel used to transmit data in the out-band networking process is referred to as an out-band channel, and the channel used to transmit data in the in-band networking process is referred to as an in-band data channel.

Figure 2:
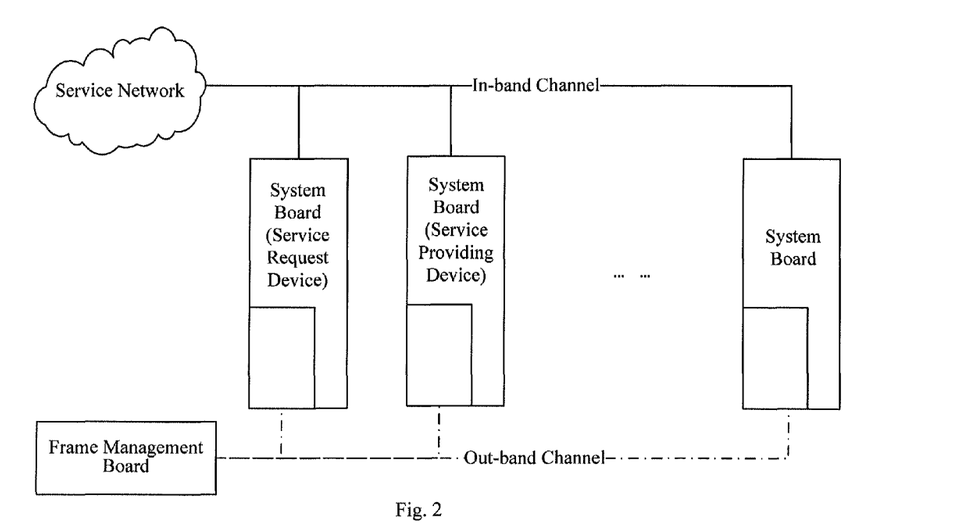
FIG. 2 is a schematic diagram illustrating the structure of a distributed system which is tree connection in an application scenario according to one embodiment.

FIG. 2 is a schematic diagram illustrating the structure of a distributed system which is tree connection in an application scenario according to one embodiment. As shown in FIG. 2, the service request device and the service providing device can each be an independent system board. On the one hand, the service request device and the service providing device are physically connected to the same management device via hardware interfaces to form an out-band channel, as shown by the dotted line in FIG. 2. On the other hand, the service request device and the service providing device are connected to a service network via network interfaces to form an in-band data channel, as shown by the solid line in FIG. 2. The service data stream is transmitted via the in-band data channel without passing through the out-band channel. Thus, the service request device, the service providing device, the out-band channel, and the management device together are equivalent to formation of an "accessing authentication system", while the service request device, the service providing device, and the in-band data channel together are equivalent to formation of a "service exchange system". Accessing authentication among devices is realized within the accessing authentication system, and service data exchange among devices is realized within the service exchange system.

The specific application environment of the distributed system which is tree connection as shown in FIG. 2 is not restricted—for instance, it is applicable in a distributed system based on a blade server; alternatively, it is further applicable in a distributed system of an exchanger having a slot connection, or in a distributed system based on a quasi-blade server having a physical tree connection structure.

Step 12: authenticating the accessing authentication information, and providing, by the service providing device, when an authentication result indicates that the authentication of the accessing authentication information is passed, service for the service request device via an in-band data channel, the service providing device and the service request device forming the in-band data channel via a service network.

In this embodiment, communications channels for service exchange and for accessing authentication are separated from each other, the service data is transmitted using the in-band data channel, and the accessing authentication information needed for accessing authentication is transmitted using the out-band channel. Since it is not necessary for the accessing authentication information needed for accessing authentication to pass through the external service network, the probability for the accessing authentication information being intercepted or tampered with during the process of transmission is reduced, and reliability for transmission of the accessing authentication information is enhanced, thereby improving the security for accessing to devices in a distributed system which is tree connection. The entire process for realizing the embodiments does not require human intervention, so hidden risks of security due to human intervention are avoided.

Figure 3:
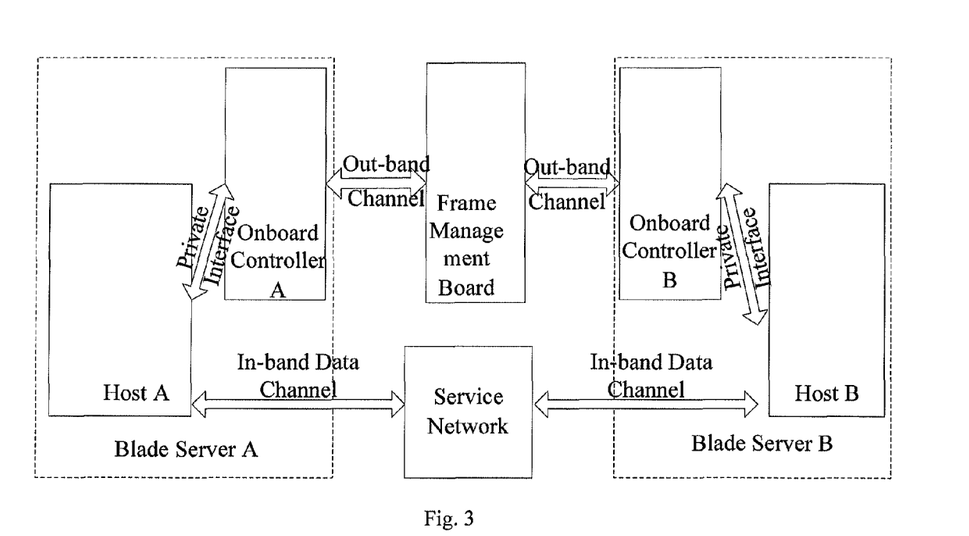
FIG. 3 is a schematic diagram illustrating the structure of a distributed system based on a blade server in an application scenario according to one embodiment.

FIG. 3 is a schematic diagram illustrating the structure of a distributed system based on a blade server in an application scenario according to one embodiment. The blade server as shown in FIG. 3 is a high availability, high density, and low cost server platform, and its main advantages rest in the capability to save use space and cost of the server, and the capability to provide the user with more flexible and convenient expanding and upgrading means. Each blade of the blade server is actually a service board. Each service board is equipped with an onboard controller, and onboard controllers of different service boards are respectively connected to a frame management board—for instance, onboard controllers of different service boards are respectively connected to the frame management board via an intelligent platform management bus (IPMB), thus that an IPMB hardware management channel is formed inside the blade server. Through the hardware management channel can be realized hardware managements of the blade server, such as up-down electricity, resetting, warning and monitoring, etc. The hardware management channel is an inbuilt channel of the blade server, as the channel does not need to transmit via the service network, does not transmit any service data stream, and is physically separated from the service network. The hosts provided on each service board of the blade server are respectively accessed to the service network via network cards, so that a communication channel is formed among various hosts of the blade server, and this communication channel can transmit service data streams via the service network.

During the process of practical application, optionally, plural blade servers are disposed in the blade server frame, each blade server is provided with a service host and an onboard controller, and the service host and the onboard controller on the same blade server communicate with each other via private interfaces. The service request device and service providing device according to the embodiments are blade servers inserted in different slots in the blade server frame, and the management device according to the embodiments is a frame management board. The in-band data channel according to the embodiments is a service data stream transmission channel formed by hosts of different service boards being connected to the service network via network cards, and the out-band channel according to the embodiments is a hardware management channel formed by the onboard controllers of each service board being connected to the frame management board via an intelligent platform management bus (IPMB).

As shown in FIG. 3, it is supposed in the blade server frame, a blade server A and a blade server B are disposed, on the blade server A, a service host A (hereinafter abbreviated as "host A") and an onboard controller A are disposed, and on the blade server B a service host B (hereinafter abbreviated as "host B") and an onboard controller B are disposed. The host A and the onboard controller A communicate with each other based on a private interface, and the host B and the onboard controller B communicate with each other also based on a private interface. Service data is transmitted between the host A and the host B via the in-band data channel and through the service network, and the accessing authentication information is transmitted between the onboard controller A and the onboard controller B via the IPMB out-band channel and through the frame management board.

The technical solution for accessing to devices in security according to the embodiments is described in detail below with reference to the application scenario of the distributed system based on a blade server as shown in FIG. 3.

Figure 4:
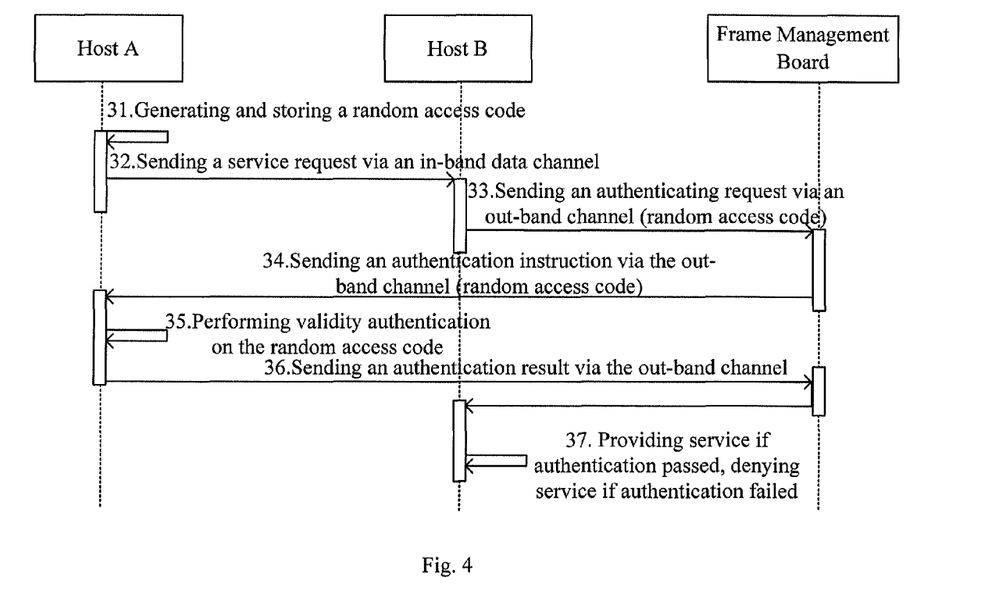
FIG. 4 is a flowchart illustrating the method for accessing to devices in security according to Embodiment 2.

FIG. 4 is a flowchart illustrating the method for accessing to devices in security according to t he second Embodiment. In this embodiment, the accessing authentication information is a random access code generated by the service request device, namely the host A, and validity authentication of the random access code is performed by the service request device, namely the host A. As shown in FIGS. 3 and 4, this embodiment includes the following steps:

Step 31: the host A generating and storing a random access code prior to the host A requesting to access to the host B.

Step 32: the host A generating a service request, and sending the service request to the host B via an in-band data channel, the service request carrying therewith position information and the random access code, wherein the position information may be a logical position of the host A in the blade server, such as the frame number and slot number of the host A.

The path through which the host A sends the service request to the host B via the in-band data channel is, for example: host A→service network→host B.

Step 33: the host B sending an authentication request to a frame management board via an out-band channel for requesting the frame management board to instruct the host A to perform validity authentication on the random access code, the authentication request carrying therewith the position information of the host A and the random access code.

Optionally, information of accessible hosts can be predefined on the host B. When the host B receives the service request, it is determined whether the host A to which the position information in the service request corresponds is a predefined accessible host—if yes, an authentication request is sent to the frame management board via the out-band channel; otherwise the service request of host A is denied, and the process ends (not shown). The advantage of processing as thus rests in the fact that the host B can guarantee the access of predefined accessible hosts, and deny the access of hosts that are not defined, thereby further enhancing access safety.

The path through which the host B sends the authentication request to the frame management board via the out-band channel is, for example: host B→onboard controller B→frame management board.

Step 34: the frame management board sending an authentication instruction to the host A via the out-band channel, the authentication instruction carrying therewith a random access code for instructing the host A to perform validity authentication on the random access code.

The path through which the frame management board sends the authentication instruction to the host A via the out-band channel is, for example: frame management board→onboard controller A→host A.

Step 35: the host A receiving the authentication instruction, and performing validity authentication on the random access code in the authentication instruction.

The host A can compare the random access code carried in the authentication instruction with a random access code, which has been generated by the host A in advance, during the process of performing validity authentication on the random access code in the authentication instruction.

If the random access code in the authentication instruction matches the random access code generated by the host A in advance, this indicates that the random access code passes the validity authentication, in which case an information notifying that the authentication is passed is sent to the host B via the out-band channel. If the random access code carried in the authentication instruction does not match the random access code generated by the host A in advance, an information notifying that the authentication is failed is sent to the host B via the out-band channel.

Step 36: the host A sending an authentication result to the host B via the out-band channel.

The path through which the host A sends the authentication result to the host B via the out-band channel is, for example: host A→onboard controller A→frame management board→onboard controller B→host B.

Step 37: the host B receiving the authentication result of the host A via the out-band channel, and determining whether to provide service to the host A according to the authentication result: the host B providing service to the host A via the in-band data channel if the authentication result indicates that the authentication of the random access code is passed; the host B denying to provide service to the host A if the authentication result indicates that the authentication of the random access code is failed.

The path through which the host B provides service to the host A via the in-band data channel is, for example: host B→service network→host A.

In order to further enhance safety of accessing authentication, optionally, the device responsible for generating the random access code, i.e. the host A in this embodiment, can generate a relatively complex random access code in the process of generating the random access code to enhance the difficulty of deciphering the random access code by brute force. The mechanism of generating the complex random access code is also applicable to the embodiments corresponding to the following FIGS. 5-7, which will not be redundantly described in this regard.

Optionally, the device responsible for performing validity authentication on the random access code, i.e. the host A in this embodiment, can preset a valid period for the random access code. For instance, the survival time of the random access code is set as 30 seconds, in which case the random access code is valid within 30 seconds from the time this random access code is generated, and the random access code is invalid after expiry of 30 seconds. The device responsible for performing validity authentication on the random access code, i.e. the host A in this embodiment, determines whether the random access code is valid before the random access code is authenticated, for instance, by calculating the time duration between the time of generating the random access code and the time of obtaining it again—if this time duration does not exceed the preset valid period, this indicates that the random access code is valid, and validity authentication is hence performed on the random access code; if this time duration exceeds the preset valid period, this indicates that the random access code is invalid, in which case it is possible to directly determine that the validity authentication on the random access code is failed. Since the more longer the survival time of the random access code is, the riskier will be for the random access code to be deciphered, tampered with or intercepted, the device responsible for the random access code controls the valid period of the random access code during the process of assessing authentication, whereby risk can be lowered, and reliability of the random access code can be enhanced, thereby enhancing safety for accessing to devices. The mechanism of controlling the valid period of the random access code is also applicable to the embodiments corresponding to the following FIGS. 4-6, which will not be redundantly described in this regard.

Optionally, if the host A is successfully accessed to the host B by the aforementioned flow, validity of access between the host A and the host B can be thereafter maintained based on a long connection mechanism, such as session or socket long connection mechanism, and there is no need to perform repeated accessing authentications. Since the "accessing authentication system" is used to perform accessing authentication, the efficiency of accessing authentication might be reduced to certain degrees at the same time of enhancing safety of accessing authentication, while introduction of the long connection mechanism is conducive to guaranteeing the validity of connection, to thereby enhance communication efficiency. That is to say, effective balance is found between safety and communication efficiency. If connection between the host A and the host B fails due to breaking of the long connection, for example due to causes, such as timeout of the session or connection break of the socket, once the host A needs to send a service request to the host B, it suffices to perform accessing authentication between the hosts based on the aforementioned flow of this embodiment, while no detailed description will be made in this context. The long connection mechanism is also applicable to the embodiments corresponding to the following FIGS. 5-7, which will not be redundantly described in this regard.

While performing accessing authentication on any two blade servers in the blade server frame in this embodiment, the service request device, namely the host A, generates a random access code and sends the random access code via the out-band channel to the service providing device, namely the host B, and when the host B retransmits the random access code to the host A via the out-band channel, the host A authenticates the random access code. If the authentication is passed, the host B provides service to the host A via the in-band data channel. Seen as such, communications channels for service exchange and for accessing authentication are separated from each other in this embodiment, service data is transmitted using the in-band data channel, and accessing authentication information is transmitted using the out-band channel without the need to pass through the service network, whereby the probability for the accessing authentication information being intercepted or tampered with during the process of transmission is reduced, and reliability for transmission of the accessing authentication information is enhanced, thereby improving the security for accessing to devices in a distributed system which is tree connection.

Figure 5:
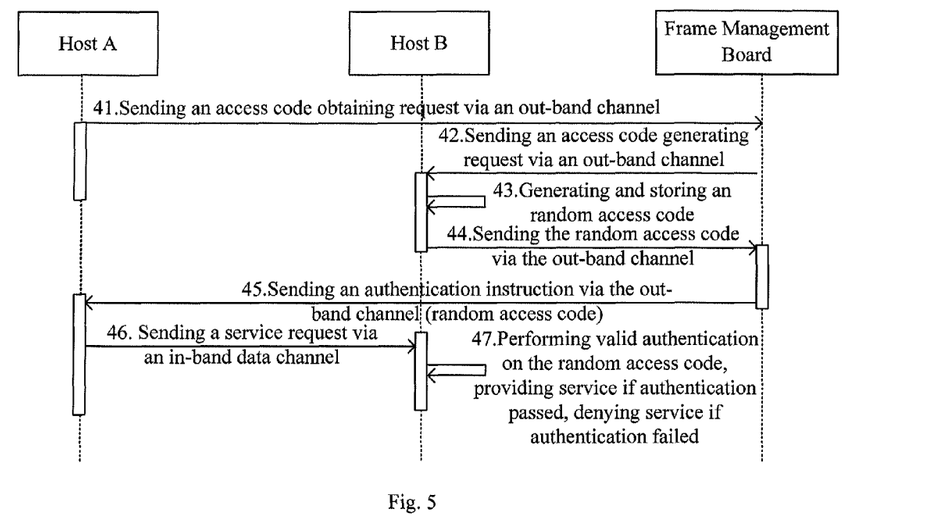
FIG. 5 is a flowchart illustrating the method for accessing to devices in security according to Embodiment 3.

FIG. 5 is a flowchart illustrating the method for accessing to devices in security according to Embodiment 3. In this embodiment, the accessing authentication information is a random access code generated by the service providing device, namely the host B, and validity authentication of the random access code is performed by the service providing device, namely the host B. As shown in FIGS. 3 and 5, this embodiment includes the following steps:

Step 41: the host A sending an access code obtaining request to the frame management board via the out-band channel prior to the host A requesting to access to the host B, the access code obtaining request carrying therewith position information of the service providing device, namely the host B.

The path through which the host A sends the access code obtaining request to the frame management board via the out-band channel is, for example: host A→onboard controller A→frame management board.

Step 42: the frame management board sending an access code generating request via the out-band channel to the host B to which the position information is directed, the access code generating request carrying therewith position information of the host A.

The path through which the frame management board sends the access code generating request via the out-band channel to the host B is, for example: frame management board→onboard controller B→host B.

Step 43: the host B generating and storing a random access code.

Optionally, information of accessible hosts can be predefined on the host B. When the host B receives the access code generating request, it is determined whether the host A to which the position information in the access code generating request corresponds is a predefined accessible host—if yes, the random access code is generated and stored; otherwise the service request of the host A is denied, and the process ends (not shown). The advantage of processing as thus rests in the fact that the host B can guarantee the access of predefined accessible hosts, and deny the access of hosts that are not defined, thereby further enhancing access safety.

Step 44: the host B sending the generated random access code via the out-band channel to the frame management board.

The path through which the host B sends the random access code via the out-band channel to the frame management board is, for example: host B→onboard controller B→frame management board.

Step 45: the frame management board sending the random access code generated by the host B via the out-band channel to the host A.

The path through which the frame management board sends the random access code via the out-band channel to the host A is, for example: frame management board→onboard controller A→host A.

Step 46: the host A receiving the random access code and generating a service request, and sending the service request via the in-band channel to the host B, the service request carrying therewith position information of the service request device, namely the host A, and the random access code received by the host A.

The path through which the host A sends the service request via the out-band channel to the host B is, for example: host A→onboard controller A→frame management board→onboard controller B→host B.

Step 47: the host B performing validity authentication on the random access code in the service request, and providing service to the host A via the in-band data channel when the authentication of the random access code is passed.

The path through which the host B provides service to the host A via the in-band data channel is, for example: host B→service network→host A.

While performing accessing authentication on any two blade servers in the blade server frame in this embodiment, the service providing device, namely the host B, generates a random access code for the service request device that requests access, namely the host A, and sends the random access code via the out-band channel to the host A; the host A sends the random access code via the out-band channel to the host B, and the host B authenticates the random access code. If the authentication is passed, the host B provides service to the host A via the in-band data channel. Seen as such, communications channels for service exchange and for accessing authentication are separated from each other in this embodiment, service data is transmitted using the in-band data channel, and accessing authentication information is transmitted using the out-band channel without the need to pass through the service network, whereby the probability for the accessing authentication information being intercepted or tampered with during the process of transmission is reduced, and reliability for transmission of the accessing authentication information is enhanced, thereby improving the security for accessing to devices in a distributed system which is tree connection.

Figure 6:
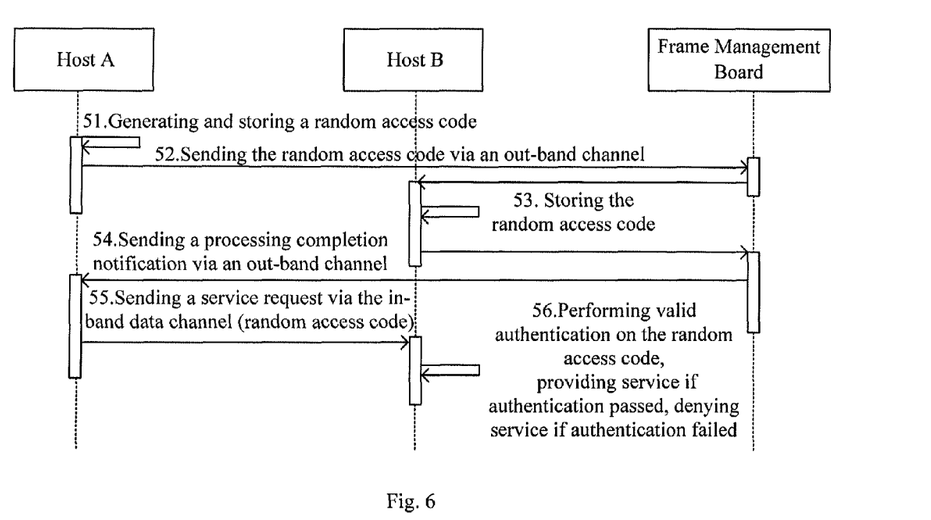
FIG. 6 is a flowchart illustrating the method for accessing to devices in security according to Embodiment 4.

FIG. 6 is a flowchart illustrating the method for accessing to devices in security according to Embodiment 4. In this embodiment, the accessing authentication information is a random access code generated by the service request device, namely the host A, and validity authentication of the random access code is performed by the service providing device, namely the host B. As shown in FIGS. 3 and 6, this embodiment includes the following steps:

Step 51: the host A generating and storing a random access code prior to the host A requesting to access to the host B.

Step 52: the host A generating a ready service request, and sending the ready service request via the out-band channel to the host B, the ready service request carrying therewith the random access code.

The path through which the host A sends the ready service request via the out-band channel to the host B is, for example: host A→onboard controller A→frame management board→onboard controller B→host B.

Step 53: the host B receiving the ready service request, and temporarily storing the random access code carried in the ready service request.

Optionally, information of accessible hosts can be predefined on the host B. When the host B receives the ready service request, it is determined whether the host A to which the position information in the ready service request corresponds is a predefined accessible host—if yes, the random access code is stored, and Step 54 is executed; otherwise the service request of the host A is denied, and the process ends (not shown). The advantage of processing as thus rests in the fact that the host B can guarantee the access of predefined accessible hosts, and deny the access of hosts that are not defined, thereby further enhancing access safety.

Step 54: the host B sending processing completion information via the out-band channel to the host A, the processing completion information being used for notifying the host A that the random access code has been stored in the host B.

The path through which the host B sends the processing completion information via the out-band channel to the host A is, for example: host B→onboard controller B→frame management board→onboard controller A→host A.

Step 55: the host A formally sending a service request via the in-band data channel to the host B, the service request carrying therewith the random access code.

The path through which the host A sends the service request via the in-band data channel to the host B is, for example: host A→service network→host B.

Step 56: the host B performing validity authentication on the random access code carried in the service request, and providing service to the host A via the in-band data channel when the authentication is passed.

The path through which the host B provides service to the host A via the in-band data channel is, for example: host B→service network→host A.

While performing accessing authentication on any two blade servers in the blade server frame in this embodiment, the service request device, namely the host A, generates a random access code, and sends the random access code via the out-band channel to the service providing device, namely the host B, in the stage of ready service; when the host A formally initiates the service request, the host B authenticates the random access code. If the authentication is passed, the host B provides service to the host A via the in-band data channel. Seen as such, communications channels for service exchange and for accessing authentication are separated from each other in this embodiment, service data is transmitted using the in-band data channel, and accessing authentication information is transmitted using the out-band channel without the need to pass through the service network, whereby the probability for the accessing authentication information being intercepted or tampered with during the process of transmission is reduced, and reliability for transmission of the accessing authentication information is enhanced, thereby improving the security for accessing to devices in a distributed system which is tree connection.

Figure 7:
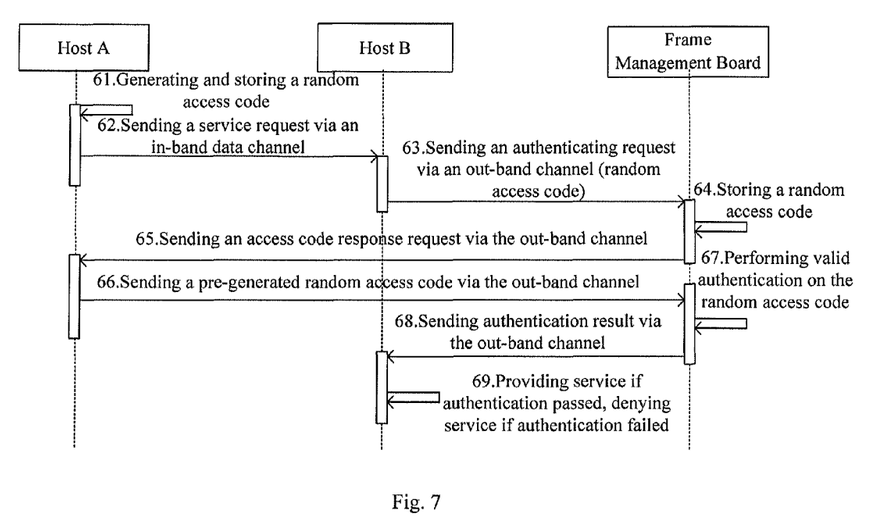
FIG. 7 is a flowchart illustrating the method for accessing to devices in security according to Embodiment 5.

FIG. 7 is a flowchart illustrating the method for accessing to devices in security provided by Embodiment 5. In this embodiment, the accessing authentication information is a random access code generated by the service request device, namely the host A, and validity authentication of the random access code is performed by the management device, namely the frame management board. As shown in FIGS. 3 and 7, this embodiment includes the following steps:

Step 61: the host A generating and storing a random access code prior to the host A requesting to access to the host B.

Step 62: the host A generating a service request, and sending the service request via the in-band data channel to the host B, the service request carrying therewith position information and the random access code, wherein the position information may be a logical position of the host A in the blade server, such as the frame number and slot number of the host A.

The path through which the host A sends the service request via the in-band data channel to the host B is, for example: host A→service network→host B.

Step 63: the host B sending an authenticating request via the out-band channel to the frame management board, the authenticating request carrying therewith position information of the host A and the random access code, the authenticating request being used for requesting to perform validity authentication on the random access code.

Optionally, information of accessible hosts can be predefined on the host B. When the host B receives the service request, it is determined whether the host A to which the position information in the service request corresponds is a predefined accessible host—if yes, the authenticating request is sent to the frame management board via the out-band channel; otherwise the service request of the host A is denied, and the process ends (not shown). The advantage of processing as thus rests in the fact that the host B can guarantee the access of predefined accessible hosts, and deny the access of hosts that are not defined, thereby further enhancing access safety.

The path through which the host B sends the authenticating request via the out-band channel to the frame management board is, for example: host B→onboard controller B→frame management board.

Step 64: the frame management board receiving the authenticating request and storing the random access code carried in the authenticating request.

Step 65: sending an access code response request via the out-band channel to the host A, for requesting to obtain from the host A the random access code generated in advance by the host A.

The path through which the frame management board sends the access code response request via the out-band channel to the host A is, for example: frame management board→onboard controller A→host A.

Step 66: the host A sending the random access code via the out-band channel to the frame management board.

The path through which the host A sends the authenticating request via the out-band channel to the frame management board is, for example: host A→onboard controller A→frame management board.

Step 67: the frame management board performing validity authentication on the random access code sent by the host A according to the stored random access code.

The process in which the frame management board performs validity authentication on the random access code sent by the host A is as follows: the frame management board compares the random access code obtained in this step with the random access code stored in Step 64—if the two are consistent, it indicates that authentication of the random access code is passed; otherwise, it indicates that authentication of the random access code is failed.

Step 68: the frame management board sending an authentication result via the out-band channel to the host B.

The path through which the frame management board sends the authentication result via the out-band channel to the host B is, for example: frame management board→onboard controller B→host B.

Step 69: the host B receiving the authentication result of the frame management board via the out-band channel, and determining whether to provide service to the host A according to the authentication result: the host B providing service via the in-band data channel to the host A if the authentication result indicates that the authentication of the random access code is passed; the host B denying to provide service to the host A if the authentication result indicates that the authentication of the random access code is failed.

While performing accessing authentication on any two blade servers in the blade server frame in this embodiment, the service request device, namely the host A, generates a random access code, and the frame management board performs validity authentication on the random access codes respectively obtained via the out-band channel and from the hosts A and B, and notifies the authentication result via the out-band channel to the host B. If the authentication is passed, the host B provides service to the host A via the in-band data channel. Seen as such, communications channels for service exchange and for accessing authentication are separated from each other in this embodiment, service data is transmitted using the in-band data channel, and accessing authentication information is transmitted using the out-band channel without the need to pass through the service network, whereby the probability for the accessing authentication information being intercepted or tampered with during the process of transmission is reduced, and reliability for transmission of the accessing authentication information is enhanced, thereby improving the security for accessing to devices in a distributed system which is tree connection.

Figure 8:
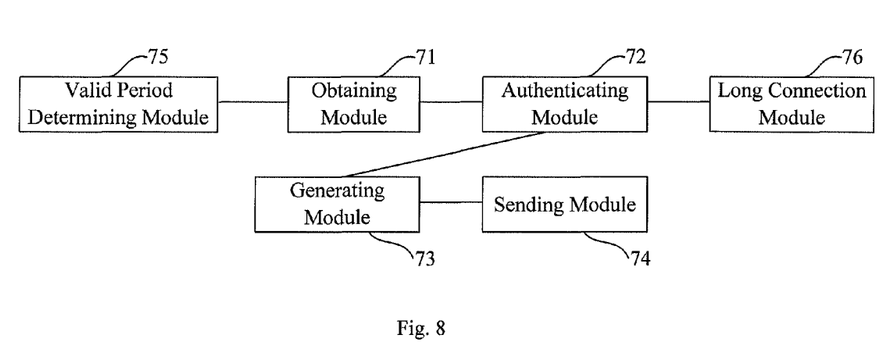
FIG. 8 is a schematic diagram illustrating the structure of the communication device according to Embodiment 6.

FIG. 8 is a schematic diagram illustrating the structure of the communication device according to Embodiment 6. As shown in FIG. 8, the communication device according to this embodiment comprises an obtaining module 71 and an authenticating module 72.

The obtaining module 71 is configured to obtain accessing authentication information via an out-band channel, the accessing authentication information is used for accessing authentication between a service request device and a service providing device, the service request device and the service providing device share the same management device, and form the out-band channel with the management device respectively.

The authenticating module 72 is configured to authenticate the accessing authentication information, and provide, by the service providing device, when an authentication result indicates that the authentication of the accessing authentication information is passed, service for the service request device via an in-band data channel, the service providing device and the service request device forming the in-band data channel via a service network.

Specific implementation modes of the communication device according to this embodiment are not restricted, for instance, the communication device according to this embodiment may specifically be a service request device, or a service providing device, or a management device.

When the communication device according to this embodiment is specifically implemented as a service request device, optionally, the communication device according to this embodiment may further comprise a generating module 73 and a sending module 74. The generating module 73 is configured to generate and store the accessing authentication information. The sending module 74 is configured to send a service request to the service providing device via the in-band data channel, the service request including the accessing authentication information. Correspondingly, the obtaining module 71 is specifically configured to receive the accessing authentication information sent by the service providing device via the out-band channel. The authenticating module 72 is specifically configured to perform validity authentication on the received assessing authentication information according to the accessing authentication information stored by the generating module, and send an authentication result via the out-band channel to the service providing device. Reference may be made to the recordation about the service request device in the embodiment that corresponds to FIG. 4 for the operating mechanism of the communication device under such circumstance, while no detailed description will be made in this context.

Alternatively, when the communication device according to this embodiment is specifically implemented as a service providing device, the communication device according to this embodiment may further comprise a generating module 73 and a sending module 74. Under such circumstance, the generating module 73 is configured to receive via the out-band channel an accessing information obtaining request sent by the service request device, and generate and store an accessing authentication information according to the accessing information obtaining request. The sending module 74 is configured to send the assessing authentication information via the out-band channel to the service request device. Correspondingly, the obtaining module 71 is specifically configured to receive via the in-band data channel a service request sent by the service request device, the service request including the accessing authentication information. The authenticating module 72 is specifically configured to perform validity authentication on the received assessing authentication information according to the stored accessing authentication information. Reference may be made to the recordation about the service request device in the embodiment that corresponds to FIG. 5 for the operating mechanism of the communication device under such circumstance, while no detailed description will be made in this context.

Alternatively, when the communication device according to this embodiment is specifically implemented as a service request device, optionally, the obtaining module 71 is specifically configured to receive via the out-band channel the accessing authentication information generated by the service request module, send via the out-band channel a feedback message indicating that the accessing authentication information has been stored to the service request device, and receive via the in-band data channel a service request sent by the service request device, the service request including the accessing authentication information. The authenticating module 72 is specifically configured to perform validity authentication on the received assessing authentication information according to the stored accessing authentication information. Reference may be made to the recordation about the service request device in the embodiment that corresponds to FIG. 6 for the operating mechanism of the communication device under such circumstance, while no detailed description will be made in this context.

Alternatively, when the communication device according to this embodiment is specifically implemented as a management device, optionally, the obtaining module 71 is specifically configured to receive via the out-band channel and storing the accessing authentication information sent by the service providing device, and obtain via the out-band channel the accessing authentication information from the service request device. The accessing authentication information sent by the service providing device is generated by the service request device and sent to the service providing device via the in-band data channel. The authenticating module 72 is specifically configured to perform validity authentication on the stored assessing authentication information according to the accessing authentication information obtained from the service request device, and send an authentication result to the service providing device via the out-band channel. Reference may be made to the recordation about the service request device in the embodiment that corresponds to FIG. 7 for the operating mechanism of the communication device under such circumstance, while no detailed description will be made in this context.

In the technical solution of the aforementioned communication device, the accessing authentication information may be a random access code. When the communication device according to this embodiment is responsible for performing validity authentication to the accessing authentication information, the communication device according to this embodiment may further comprise a valid period determining module 75. The valid period determining module 75 is configured to determine whether the random access code is in a preset valid period. Correspondingly, the authenticating module 72 is specifically configured to authenticate the random access code when it is determined that the random access code is in the preset valid period.

In the technical solution of the aforementioned communication device, in order to enhance communication efficiency, optionally, the communication device according to this embodiment may further comprise a long connection module 76. The long connection module 76 is configured to maintain, after the authentication of the accessing authentication information is passed, via the in-band data channel, access connection between the service request device and the service providing device in a long connection mode.

In this embodiment, communications channels for service exchange and for accessing authentication are separated from each other, service data is transmitted using the in-band data channel, and accessing authentication information needed for accessing authentication is transmitted using the out-band channel. Since it is not necessary for the accessing authentication information needed for accessing authentication to pass through the external service network, the probability for the accessing authentication information being intercepted or tampered with during the process of transmission is reduced, and reliability for transmission of the accessing authentication information is enhanced, thereby improving the security for accessing to devices in a distributed system which is tree connection.

Embodiments further provide a communication system that includes a communication device as shown in FIG. 8-*for* its networking mode, reference can be made to FIG. 2 or FIG. 3. The communication device in the communication system may specifically be a service request device, a service providing device, or a management device. Reference may be made to the recordation about the embodiments that correspond to FIGS. 1 and 4-7 for the operating mechanism of each node in the communication system, while no detailed description will be made in this context.

As comprehensible to persons ordinarily skilled in the art, the accompanying drawings are merely schematic views of the embodiments, and the modules or flows as illustrated in the accompanying drawings are not necessarily indispensable to the present application.

As comprehensible to persons ordinarily skilled in the art, the modules in the devices in the embodiments can be disposed in the devices as described in the embodiments, and can also be correspondingly modified to locate in one or more devices in the embodiments different from the present embodiments. The modules of the aforementioned embodiments can be either integrated as one module, or further divided into a plurality of sub-modules.

The serial numbers of the embodiments are merely for the sake of description, rather than for representing superiority of some embodiments over others.

As comprehensible to persons ordinarily skilled in the art, the entire or partial steps of the aforementioned method embodiments can be executed by a program instructing relevant hardware, and the program can be stored in a computer-readable storage medium and, when executed, execute the steps of the aforementioned method embodiments. The storage medium can be any media capable of storing program codes, such as a read-only memory (ROM), a random access memory (RAM), a magnetic disk, or an optical disk, etc.

As should be finally explained, the aforementioned embodiments are merely exemplary solutions to the problems in the prior art, and should not be understood to restrict the claims. It should be understood that the technical solutions described in the various foregoing embodiments can be modified or equivalently replaced with partial technical features. Such modified embodiments are understood to fall within the scope of the claims.

What is claimed is:

1. A method for securely accessing a device, comprising:
obtaining access authentication information via an out-band channel, the access authentication information being used for access authentication between a service request device and a service providing device, the service request device and the service providing device sharing the same management device, and forming the out-band channel with the management device respectively;
authenticating the access authentication information;
providing, by the service providing device, when an authentication result indicates that the access authentication information is authenticated, service for the service request device via an in-band data channel, the service providing device and the service request device forming the in-band data channel via a service network, and
prior to obtaining the access authentication information via the out-band channel, generating and storing, by the service request device, the access authentication information, and
sending, by the service request device, a service request to the service providing device via the in-band data channel, the service request comprising the access authentication information;
wherein obtaining the access authentication information via the out-band channel comprises:
receiving, by the service request device via the out-band channel, the access authentication information from the service providing device; and
wherein authenticating the access authentication information comprises: performing, by the service request device, validity authentication on the received access authentication information according to the stored access authentication information, and sending the authentication result to the service providing device via the out-band channel.

2. The method according to claim 1, wherein the access authentication information is a random access code; and
prior to authenticating the access authentication information, the method further comprises determining whether the random access code is in a preset valid period; and
wherein authenticating the access authentication information comprises: authenticating the random access code when it is determined that the random access code is in the preset valid period.

3. The method according to claim 1, further comprising, after the access authentication information is authenticated, maintaining, by the service request device and the service providing device via the in-band data channel, access connection between the service request device and the service providing device in a long connection mode.

4. A communication device, comprising:
a processor coupled to a memory configured to obtain access authentication information via an out-band channel, the access authentication information being used for accessing access authentication between a service request device and a service providing device, the service request device and the service providing device sharing the same management device, and forming the out-band channel with the management device respectively; and
authenticate the access authentication information, and provide, by the service providing device, when an authentication result indicates that access authentication information is authenticated, service for the service request device via an in-band data channel, the service providing device and the service request device forming the in-band data channel via a service network,
wherein the processor is further configured to generate and store the access authentication information;
wherein the communication device further comprises a sender configured to send a service request to the service providing device via the in-band data channel, the service request comprising the access authentication information;
wherein the processor is further configured to receive, via the out-band channel, the access authentication information from the service providing device; and
perform validity authentication on the received access authentication information according to the access authentication information stored by the processor, and send the authentication result to the service providing device via the out-band channel.

5. The communication device according to claim 4, wherein the access authentication information is a random access code; and the processor
is further configured to determine whether the random access code is in a preset valid period; and
authenticate the random access code when it is determined that the random access code is in the preset valid period.

6. The communication device according to claim 4, wherein the processor is further configured to
maintain, after the access authentication information is authenticated, via the in-band data channel, access connection between the service request device and the service providing device in a long connection mode.

7. A method for securely accessing a device, comprising:
obtaining access authentication information via an out-band channel, the access authentication information being used for access authentication between a service request device and a service providing device, the service request device and the service providing device sharing the same management device, and forming the out-band channel with the management device respectively;
authenticating the access authentication information;
providing, by the service providing device, when an authentication result indicates that the authentication of the access authentication information is authenticated, service for the service request device via an in-band data channel, the service providing device and the service request device forming the in-band data channel via a service network;
prior to obtaining the access authentication information via the out-band channel, receiving, by the service providing device via the out-band channel, an access information obtaining request from the service request device;
wherein obtaining the access authentication information via the out-band channel comprises:
generating and storing, by the service providing device, the access authentication information according to the access information obtaining request, and sending the access authentication information to the service request device via the out-band channel;

wherein prior to authenticating the access authentication information, the method further comprises receiving, by the service providing device via the in-band data channel, a service request sent by the service request device, the service request comprising the access authentication information; and wherein authenticating the access authentication information comprises: performing, by the service providing device, validity authentication on the received access authentication information according to the stored access authentication information.

8. A method for securely accessing a device, comprising:

obtaining access authentication information via an out-band channel, the access authentication information being used for access authentication between a service request device and a service providing device, the service request device and the service providing device sharing the same management device, and forming the out-band channel with the management device respectively;

authenticating the access authentication information; and providing, by the service providing device, when an authentication result indicates that the authentication of the access authentication information is authenticated, service for the service request device via an in-band data channel, the service providing device and the service request device forming the in-band data channel via a service network, wherein obtaining the access authentication information via the out-band channel comprises:

receiving the access authentication information from the service providing device via the out-band channel, the access authentication information being generated by the service request device; and sending, by the service providing device via the out-band channel, a feedback message indicating that the access authentication information has been stored to the service request device, and receiving, via the in-band data channel, the service request sent by the service request device, the service request comprising the access authentication information; and wherein authenticating the access authentication information comprises:

performing, by the service providing device, validity authentication on the received access authentication information according to the stored access authentication information.

9. A method for securely accessing a device, comprising:

obtaining access authentication information via an out-band channel, the access authentication information being used for access authentication between a service request device and a service providing device, the service request device and the service providing device sharing the same management device, and forming the out-band channel with the management device respectively;

authenticating the access authentication information; and providing, by the service providing device, when an authentication result indicates that the authentication of the access authentication information is authenticated, service for the service request device via an in-band data channel, the service providing device and the service request device forming the in-band data channel via a service network, wherein prior to obtaining the access authentication information via the out-band channel, the method further comprises, generating and storing, by the service request device, the access authentication information, and sending, by the service request device, a service request to the service providing device via the in-band data channel, the service request comprising the access authentication information;

wherein obtaining the access authentication information via the out-band channel comprises:

receiving via the out-band channel and storing, by the management device, the access authentication information sent by the service providing device, and obtaining the access authentication information via the out-band channel from the service request device; and wherein authenticating the access authentication information comprises: performing, by the management device, validity authentication on the stored access authentication information according to the access authentication information obtained from the service request device, and sending the authentication result via the out-band channel to the service providing device.

10. A communication device, comprising:

a processor coupled to a memory configured to obtain access authentication information via an out-band channel, the access authentication information being used for access authentication between a service request device and a service providing device, the service request device and the service providing device sharing the same management device, and forming the out-band channel with the management device respectively; and authenticate the access authentication information, and provide, by the service providing device, when an authentication result indicates that the authentication of the access authentication information is authenticated, service for the service request device via an in-band data channel, the service providing device and the service request device forming the in-band data channel via a service network, wherein the processor is further configured to receive, via the out-band channel, an access information obtaining request from the service request device, and generate and store the access authentication information according to the access information obtaining request;

wherein the communication device further comprises a sender configured to send the access authentication information to the service request device via the out-band channel;

wherein the processor is further configured to receive, via the in-band data channel, a service request from the service request device, the service request comprising the access authentication information; and perform validity authentication on the received access authentication information according to the stored access authentication information.

11. A communication device, comprising:

a processor coupled to a memory configured to obtain access authentication information via an out-band channel, the access authentication information being used for access authentication between a service request device and a service providing device, the service request device and the service providing device sharing the same management device, and forming the out-band channel with the management device respectively; and authenticate the access authentication information, and provide, by the service providing device, when an authentication result indicates that the authentication of the access authentication information is authenticated, service for the service request device via an in-band data channel, the service providing device and the service request device forming the in-band data channel via a service network, wherein the processor is further configured to receive the access authentication information via the out-band channel, the access authentication information being generated by the service request device; send, via the out-band channel, a feedback message indicating that the access authentication information has been stored to the service request device, and receive, via the in- band data channel, a service request from the service request device, the service request comprising the access authentication information; and perform validity authentication on the received access authentication information according to the stored access authentication information.

12. A communication device, comprising:

a processor coupled to a memory configured to obtain access authentication information via an out-band channel, the access authentication information being used for access authentication between a service request device and a service providing device, the service request device and the service providing device sharing the same management device, and forming the out-band channel with the management device respectively; and authenticate the access authentication information, and provide, by the service providing device, when an authentication result indicates that the authentication of the access authentication information is authenticated, service for the service request device via an in-band data channel, the service providing device and the service request device forming the in-band data channel via a service network, wherein the processor is further configured to receive, via the out-band channel, and store the access authentication information from the service providing device, and obtain the access authentication information via the out-band channel from the service request device, the access authentication information sent by the service providing device being generated by the service request device and sent to the service providing device via the in-band data channel; and perform validity authentication on the stored access authentication information according to the access authentication information obtained from the service request device, and send the authentication result via the out-band channel to the service providing device.

* * * * *